(12) United States Patent
Yamazaki

(10) Patent No.: US 6,929,879 B2
(45) Date of Patent: Aug. 16, 2005

(54) BATTERY HAVING A CIRCUIT BOARD ATTACHED TO IT AND A MOLDED SECTION ENVELOPING THE BATTERY AND THE CIRCUIT BOARD

(75) Inventor: Masato Yamazaki, Sagamihara (JP)

(73) Assignee: Kyocera Corporation, Kyoto (JP)

(*) Notice: Subject to any disclaimer, the term of this patent is extended or adjusted under 35 U.S.C. 154(b) by 25 days.

(21) Appl. No.: 10/174,400

(22) Filed: Jun. 17, 2002

(65) Prior Publication Data

US 2003/0008208 A1 Jan. 9, 2003

(30) Foreign Application Priority Data

Jun. 19, 2001 (JP) ........................................ 2001-184834

(51) Int. Cl.[7] ........................... H01M 2/24; B65D 85/00
(52) U.S. Cl. ...................... 429/158; 429/160; 429/121; 429/178; 206/703; 206/706; 264/272.21
(58) Field of Search ................................. 429/158, 159, 429/160, 123, 100, 185, 7, 121, 161, 174, 180, 178; 264/272.21, 272.14, 273, 297.1, 249, 104; 136/293; 206/706

(56) References Cited

U.S. PATENT DOCUMENTS 4,920,019 A  * 4/1990 Stoklosa et al. ............ 429/122
5,229,641 A    7/1993 Katayama
6,080,508 A    6/2000 Dasgupta et al.

FOREIGN PATENT DOCUMENTS

| GB | 2 360 972 A | 10/2001 | |
| JP | 06-140023 | 5/1994 | |
| JP | 07-320716 | 12/1995 | |
| JP | 2000-277076 | 10/2000 | |
| JP | 2000-311667 | 11/2000 | |
| JP | 2000315483 | 11/2000 | |
| WO | WO 00/41253 | * 7/2000 | ............ H01M/2/10 |

* cited by examiner

*Primary Examiner*—Raymond Alejandro
(74) *Attorney, Agent, or Firm*—Schulte Roth & Zabel LLP; Joel E. Lutzker; Mayankkumar Dixit

(57) ABSTRACT

In order to provide a battery in which a molded section can be fixed to a battery cell, a battery comprises a battery cell, a circuit board which is attached to the battery cell, an electrode terminal which connects the battery cell and the circuit board electrically, a molded section which adheres the circuit board and the electrode terminal to the battery cell as an entire unit, adhesion strengthened areas which are formed between the electrode terminal and the battery, and electrode terminal inner surface resin sections which are formed in a part of the molded section of the adhesion strengthened area.

7 Claims, 3 Drawing Sheets

[PRIOR ART]

BATTERY HAVING A CIRCUIT BOARD ATTACHED TO IT AND A MOLDED SECTION ENVELOPING THE BATTERY AND THE CIRCUIT BOARD

BACKGROUND OF THE INVENTION

1. Field of the Invention

The present invention relates to a battery which is preferable to be used for devices such as mobile terminals, and particularly relates to a battery which is provided with a circuit board.

2. Description of Related Art

Conventionally, a battery for a mobile terminal such as a mobile phone, has been known. Further, a battery having a battery cell to which various circuit boards such as a protection circuit that deals with an overcharge, for example, has been provided. In a general sense, the circuit board has been adhered to the battery cell by molded resin so as to form one entire unit which would improve handling accommodation and prevent conflicts regarding industrial design.

FIGS. 4 to 6 are examples of a conventional battery. In FIG. 4, reference numeral 1 indicates a battery cell, and reference numeral 2 indicates a molded section. Battery cell 1 is formed in a rectangular shape so as to have a constant thickness, with most of the battery cell covered by aluminum casing 3. Aluminum casing 3 forms an anode, and a cathode which is formed on one side of casing 3 (not shown in the drawing).

As shown in FIGS. 5 and 6, circuit board 5 is mounted on side surface 4 of battery cell 1. Circuit board 5 is formed by mounting various electronic units 7 on board 6. Circuit board 5 is attached to battery cell 1 by positioning board 6 in parallel with side surface 4 and adhering the back surface of board 6 to side surface 4 by double-face sticking tape 8.

Circuit board 5 and battery cell 1 are connected electrically by electrode terminal 10. That is, output terminal board 12 is fixed on side surface 11 of casing 3 of battery cell 1. Input terminal 13 is disposed on an upper surface of an edge of board 6. A space between output terminal board 12 and input terminal board 13 is connected by electrode terminal 10.

Electrode terminal 10 is formed by bending a strip of conductive board. Electrode terminal 10 comprises fixed section 14 of one end of which is fixed on output terminal board 12, extracted section 15 which is bent orthogonally along the side shape of casing 3 from fixed section 14 while contacting side surface 4 and extending along side surface 4, bent section 16 which is bent in a direction from extracted section 15 towards the far side of side surface 4, and fixed section 17 which extends along board 6 from bent section 16 and fixed on input terminal 13. The above explained electrical configuration describes the case of an anode region. The cathode region has an equivalent structure wherein battery cell 1 and circuit board 5 are connected.

Circuit board 5 and electrode terminal 10 are embedded in molded section 2. Circuit board 5 and electrode terminal 10 are attached to battery cell 1 so as to form an entire unit by molded section 2. That is, in the battery, circuit board 5 and electrode terminal 10 and the like are assembled to battery cell 1, and circuit board 5 and electrode terminal 10 are molded so as to be embedded in a resin, and molded section 2 made of the resin is formed to be an entire unit with battery cell 1.

Also, power supply output from battery cell 1 and circuit board 5 is extracted from connector 19 via output cable 18 as shown in FIG. 4.

In a case of the above battery, when performing molding to battery cell 1, a region where adhesion strength between battery cell 1 and molded section 2 cannot be obtained sufficiently is generated. Thus, there is a problem that a part of molded section 2 might be scraped off from battery cell 1 after production.

In the above battery, extracted section 15 of electrode terminal 10 contacts side surface 4. Thus, the position of electrode terminal 10 is close to side surfaces 4 and 11 of battery cell 1. Therefore, the resin cannot go between electrode terminal 10 and side surfaces 4 and 11 when performing molding. In such a region, the area which is required for adhesion of molded section 2 to side surfaces 4 and 11 becomes insufficient. Therefore, the adhesion strength of such a region becomes insufficient, and it is a problem that an area in molded section 2 as shown by reference numeral 20 in FIG. 4 could get scraped off.

Additionally, in the above battery, when molded section 2 is scraped from battery cell 1, such a product cannot be delivered as commercial goods. Also, it is difficult to disassemble such products for the purpose of reuse from a cost point of view, because of bad yield of battery production, and more importantly because of a huge financial loss.

The present invention was made in consideration of the above situation and disadvantages. An object of the present invention is to provide a battery which can adhere a molded section to a battery cell tightly in a battery in which a circuit board and an electrode terminal are adhered to a battery cell so as to form an entire unit by performing molding.

SUMMARY OF THE INVENTION

In order to achieve the above object, the present invention provides the following battery.

A first aspect of the present invention is characterized in that a battery comprises a battery cell, a circuit board which is attached to the battery cell, an electrode terminal which connects the battery cell and the circuit board electrically, a molded section which adheres the circuit board and the electrode terminal to the battery cell as an entire unit, an adhesion strengthened area which is formed between the electrode terminal and the battery, an electrode terminal inner surface resin section which is formed in a part of the molded section of the adhesion strengthened area.

In a battery according to the present invention, when performing molding in order to form a molded section on the battery cell, resin flows into an adhesion strengthened area on an inner surface of the electrode terminal, and an electrode terminal inner surface resin section is formed therein. The electrode terminal inner surface resin section adheres to a surface of the battery cell and strengthens the adhesion of the molded section to the battery cell.

A second aspect of the present invention is characterized in that, in a battery, a through-hole is formed on an electrode terminal in a direction toward a battery cell, a connecting resin section is filled and formed in the through-hole so as to connect the resin section on an outside of the electrode terminal and the electrode terminal inner surface resin section.

In a battery according to the present invention, when performing molding to a battery cell so as to form a molded section, resin can go through a through-hole and flow into inside of the adhesion strengthened area sufficiently. Therefore, the electrode terminal inner surface side resin section can be formed reliably.

A third aspect of the present invention is characterized in that, in a battery according to a first or second aspect of the present invention, an electrode terminal comprises a first adhesion section which is adhered to a battery cell, a standing edge section which extends in a direction from the surface of the battery cell towards the far side, an extracted section which is attached to the standing edge section and extends along the surface of the battery cell, a second adhesion section which is disposed to be connected with the extracted section and fixed on the circuit board.

In a battery according to the present invention, an adhesion strengthened area is formed between an extracted section of the electrode terminal and a battery cell, and an electrode terminal inner surface side resin section is formed in the adhesion strengthened area.

As explained above, according to a first aspect of the present invention, when performing molding on a battery cell so as to form a molded section, resin flows into an adhesion strengthened section on an inner surface of the electrode terminal, and an electrode terminal inner surface side resin section is formed therein. Therefore, the molded section can be adhered to the battery cell tightly, and the scrape-off of the molded section can be prevented so as to improve the product yield.

Also, according to a second aspect of the present invention, when performing molding on a battery cell so as to form a molded section, resin can flow into an adhesion strengthened section sufficiently via the through-hole. Therefore, the electrode terminal inner surface side resin section can be formed reliably and the scrape-off of the molded section can be prevented securely.

Also, according to a third aspect of the present invention, the electrode terminal is provided with a first adhesion section, a standing edge section, an extracted section, and a second adhesion section. Therefore, a sufficient area for an adhesion strengthened section between the extracted section and the battery cell can be obtained, and a large area for adhering the molded section to the battery cell can be obtained. As such, the scrape-off of the molded section can be reliably prevented.

DETAILED DESCRIPTION OF THE INVENTION

Figure 1:
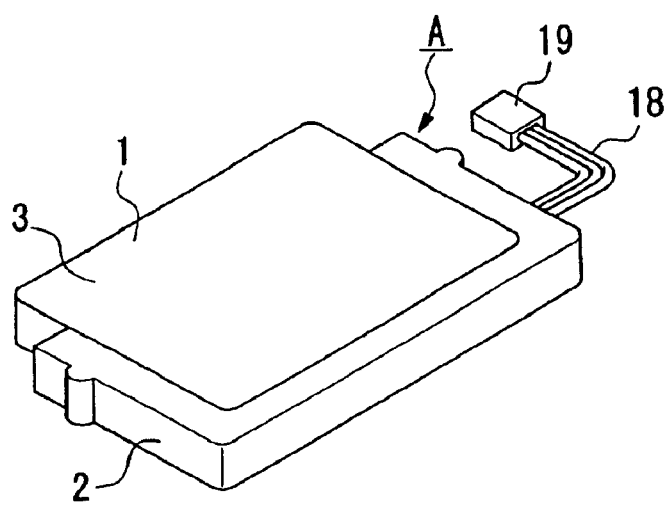
FIG. 1 is a perspective view of an embodiment of the present invention.
Figure 2:
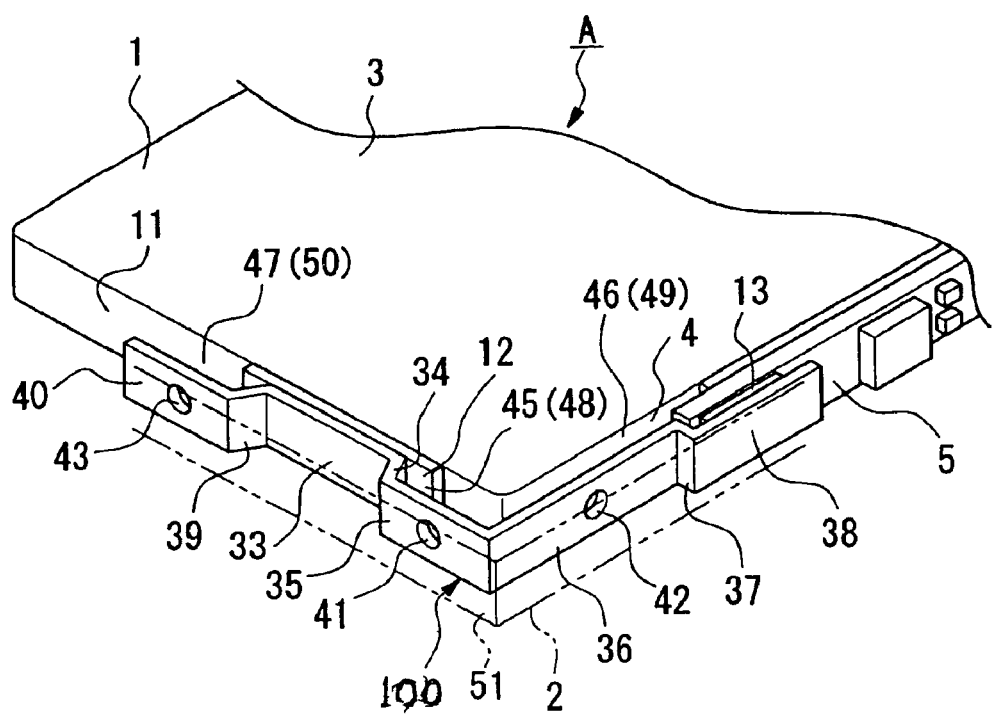
FIG. 2 is an enlarged view of the main part of the battery as shown in FIG. 1.
Figure 3:
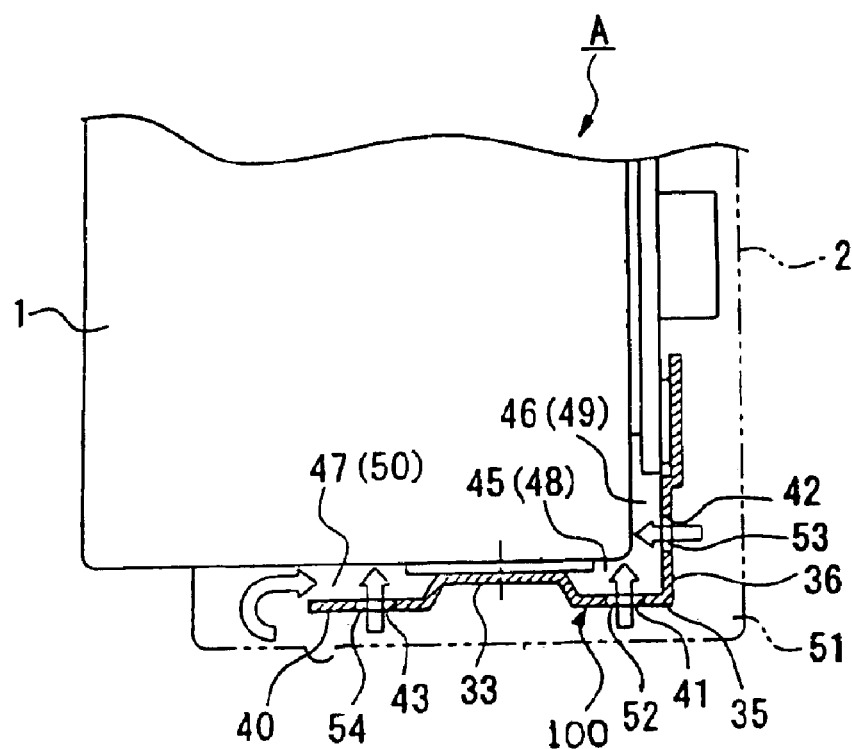
FIG. 3 is a view showing the flow of the resin in a battery shown in FIG. 1.

An embodiment of the present invention is explained with reference to the drawings as follows. FIGS. 1 to 3 demonstrate the case in which the present invention is applied to a battery for a mobile terminal. In this embodiment, a battery A (battery) for a mobile terminal is provided with circuit board 5 which is attached to battery cell 1, and electrode terminal 100 which connects battery cell 1 and circuit board 5 electrically. In battery A, circuit board 5 and electrode terminal 100 are adhered to battery cell 1 by molded section 2 so as to form an entire unit. This basic structure is the same as the case as shown in FIGS. 4 to 6.

Figure 4:
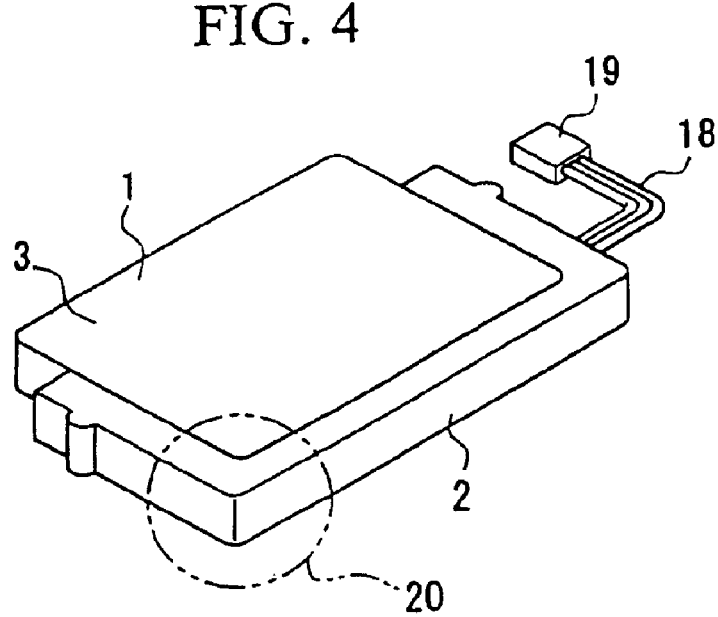
FIG. 4 is a perspective view of a conventional battery with a problem area designation.
Figure 5:
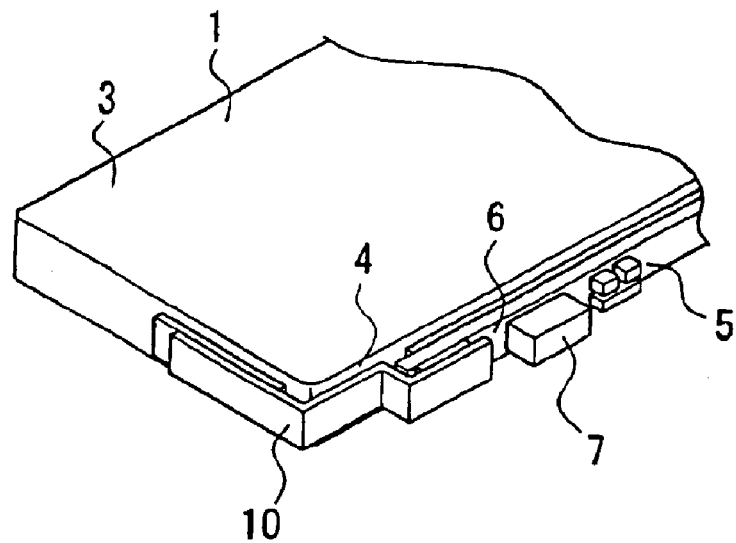
FIG. 5 is a perspective view of a main part of the battery shown in FIG. 4.
Figure 6:
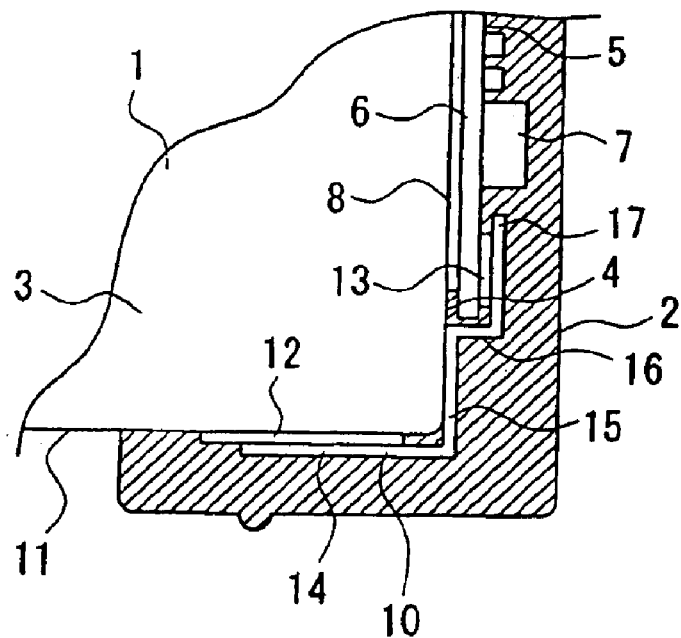
FIG. 6 is an enlarged cross section of the battery shown in FIG. 4.

Additionally, in FIGS. 1 to 3, the same reference numerals are added to the same items shown in FIGS. 4 to 6 to omit the duplicated explanation. An explanation is made only to the items which are different from the case of FIGS. 4 to 6.

A structure of electrode terminal 100 in battery A for a mobile terminal is different from electrode terminal 100 in FIGS. 4 to 6.

That is, electrode terminal 100 is formed by bending a strip of conductive board as shown in FIG. 2. Electrode terminal 100 is provided with first adhesion section 33 which is adhered to output terminal board 12 of battery cell 1, standing edge section 34 which extends in a direction from side surface 11 of battery cell 1 towards the far side, first extracted section 35 which is attached to standing edge section 34 and extends along side surface 11, second extracted section 36 which is attached to first extracted section 35 and bends along the shape of casing 3 from extracted section 35 and extends along side surface 4, bent section 37 which is attached to extracted section 36 and is bent in a direction from side surface 4 towards the far side, and second adhesion section 38 which extends along board 6 from bent section 37 and is attached to input terminal 13.

Also, electrode terminal 100 is provided with standing edge section 39 which is attached to first adhesion section 33 and extends in a direction from side surface 11 towards the far side, extended section 40 which is attached to standing edge section 39 and extends along side surface 11. Also, in first extracted section 35, second extracted section 36 and extended section 40, through-holes 41, 42, and 43 are formed which are directed towards side surface 11 (or side surface 4) respectively.

In the above structure, adhesion strengthened section 45 is an area which, in advance of the molding operation of molded section 2, is formed among first extracted section 35, output terminal board 12, and side surface 11. Also adhesion strengthened section 46 is formed between second extracted section 36 and side surface 4. Adhesion strengthened section 47 is formed among extended section 40, output terminal board 12, and side surface 11.

In battery A for a mobile terminal, electrode terminal 100 is formed as described above, and adhesion strengthened sections 45, 46, and 47 are formed. Therefore, resin flows into the adhesion strengthened sections 45, 46, and 47 via through-holes 41, 42, and 43 when performing molding so as to form molded section 2 as shown by an arrow in FIG. 3. Electrode terminal inner surface side resin sections 48, 49 and 50 are formed in these regions. Thus, connecting resin sections 52, 53, and 54 which connect resin section 51 on the outside of electrode terminal 100 and electrode terminal inner surface side resin sections 48, 49, and 50 in through-holes 41, 42, and 43 are formed by filling resin thereinto.

Therefore, in a battery for a mobile terminal, resin adheres to side surfaces 11 and 4 of battery cell 1 even on an inner surface of electrode terminal 100, and sufficient adhesion area can be obtained in a region where electrode terminal 100 of molded section 2 is disposed. Thus, a sufficient adhesion strength can be obtained.

For a resin for molding molded section 2, polyamide resin, or polyurethane resin are preferable. Among such resins, if polyamide resin having superior fluidity is used, electrode terminal inner surface side resin sections 48, 49, and 50 can be formed securely by arranging the diameter of the through-holes 41, 42, and 43 nearly to 1 mm.

As mentioned above, according to battery A for a mobile terminal of the present invention, electrode terminal inner surface side resin sections 48, 49, and 50 are formed on an inner surface of electrode terminal 100. Therefore, molded section 2 is adhered to battery cell 1 tightly making it possible to prevent molded section 2 from scraping off from battery cell 1.

Also, because through-holes 41, 42, and 43 are formed on electrode terminal 100, the resin can flow into adhesion strengthened sections 45, 46, and 47 sufficiently through through-holes 41, 42, and 43 when performing molding so as to form molded section 2. Thus, electrode terminal inner surface side resin sections 48, 49, and 50 can be formed reliably.

Also, in this embodiment of the present invention, because electrode terminal 100 is provided with first adhesion section 33, standing edge section 34, first extracted section 35, second extracted section 36, standing edge section 39, and extended section 40, sufficient space for adhesion strengthened sections 45, 46, and 47 can be obtained, and sufficient adhesion area for battery cell 1 can be obtained. Thus, molded section 2 can be adhered to battery cell 1 tightly.

As described above, in battery A for a mobile terminal, molded section 2 is not scraped off, and there is an effect that the product yield will improve.

Additionally, in an above embodiment, although the shape of electrode terminal 100 is in a strip board, the shape of electrode terminal 100 can preferably be selected according to a factor such as attaching the position of circuit board 5. It is effective to form a through-hole if an area for electrode terminal 100 is large. Also, the present invention can be applied not only to a battery for a mobile terminal, but also to batteries for various electronic apparatuses.

What is claimed is:

1. A battery comprising:

a battery cell;

a circuit board which is attached to the battery cell;

an electrode terminal which connects the battery cell and the circuit board electrically;

a molded section which adheres the circuit board and the electrode terminal to the battery cell as an entire unit;

space which serves for an adhesion strengthened area, the space formed between the electrode terminal and the battery cell by injecting a resin in a molding operation;

an electrode terminal inner surface resin section which is formed by the resin which is injected into the space as a part of the molded section, wherein the circuit board is disposed on and attached on the battery cell, the electrode terminal has a first adhesion section attached to a terminal of the battery cell, a second adhesion section attached to a terminal of the circuit board, a standing edge section which stands on the first adhesion section so as to be in a direction in which the standing edge section should be away from the first adhesion section, and an extracted section connecting the standing edge section and the second adhesion section, the space is formed between the extracted section and the battery cell, and the circuit board and the electrode terminal are embedded in the resin by performing the molding operation.

2. A battery according to claim 1, wherein a through-hole is formed on the electrode terminal in a direction toward the battery cell;

a connecting resin section is filled and formed in the through-hole so as to connect a resin section on an outside of the electrode terminal and the electrode terminal inner surface resin section.

3. A battery according to claim 1, wherein the electrode terminal has an extended section which extends along a side surface of the battery cell so as to have a space between the battery cell and the extended section;

the extended section is embedded in the resin by performing the molding operation.

4. A battery according to claim 2, wherein the electrode terminal has an extended section which extends along a side surface of the battery cell so as to have a space between the battery cell and the extended section;

the extended section is embedded in the resin by performing the molding operation.

5. A battery comprising:

a battery cell;

a circuit board which is attached to the battery cell;

an electrode terminal which connects the battery cell and the circuit board electrically;

a molded section which adheres the circuit board and the electrode terminal to the battery cell as an entire unit;

an enlarged space which serves for an adhesion strengthened area, the space formed between the electrode terminal and the battery cell by injecting a resin in a molding operation; and an electrode terminal inner surface resin section which is formed by the resin which is injected into the enlarged space as a part of the molded section, wherein the circuit board is disposed on and attached on the battery cell, the electrode terminal has a first adhesion section attached to a terminal of the battery cell, a second adhesion section attached to a terminal of the circuit board, and an extracted section connecting the first and second adhesion sections, the enlarged space is formed between the extracted section and the battery cell, the extracted section has at least one through hole through which the resin in the electrode terminal inner surface resin section is injected, and the circuit board and the electrode terminal are embedded in the resin by performing the molding operation.

6. A battery according to claim 5, wherein the through-hole is formed in the electrode terminal in a direction toward a battery cell.

7. A battery according to claim 5, wherein the electrode terminal has an extended section which extends along a side surface of the battery cell so as to have a space between the battery cell and the extended section;

the extended section has at least one through hole through which the resin is injected; and the extended section is embedded in the resin by performing the molding operation.

* * * * *